United States Patent [19]

Schiller et al.

[11] Patent Number: 6,143,814
[45] Date of Patent: Nov. 7, 2000

[54] FUSIBLE STABILIZER COMBINATION

[75] Inventors: Michael Schiller, Arnoldstein; Hartmut Hensel, Viktring; Charles Videler, Nötsch; Emil Lattacher; Paul Ebner, both of Arnoldstein; Klaus Dolleschal, Villach; Karoline Pacher, Liebenfels; Claudia Umfahrer, Hermagor, all of Austria

[73] Assignee: Chemson Polymer-Additive Gesellschaft mbH, Arnoldstein, Austria

[21] Appl. No.: 09/147,492

[22] PCT Filed: Jul. 3, 1997

[86] PCT No.: PCT/EP97/03526

§ 371 Date: May 7, 1999

§ 102(e) Date: May 7, 1999

[87] PCT Pub. No.: WO98/01412

PCT Pub. Date: Jan. 15, 1998

[30] Foreign Application Priority Data

Jul. 8, 1996 [DE] Germany ............... 196 27 258

[51] Int. Cl.⁷ ............... C08K 5/36; C08K 5/13; C08K 5/04; C08K 5/09; C08K 3/10
[52] U.S. Cl. ............ 524/303; 524/343; 524/399; 524/400; 524/413; 524/434; 524/436; 524/563; 524/567; 524/568; 524/570; 252/367.7; 252/400.52; 252/400.53; 252/400.61
[58] Field of Search ............... 524/303, 343, 524/399, 400, 413, 434, 436, 563, 567, 568, 570; 252/367.7, 400.52, 400.53, 400.61

[56] References Cited

U.S. PATENT DOCUMENTS 5,451,628  9/1995  Baker ................... 524/399

FOREIGN PATENT DOCUMENTS

| 0 565 184 | 10/1993 | European Pat. Off. . |
| 28 27 231 | 1/1979 | Germany . |
| 40 02 988 A1 | 8/1991 | Germany . |
| 43 00 059 C1 | 6/1994 | Germany . |
| 43 05 944 | 9/1994 | Germany . |
| WO 93/16979 | 9/1993 | WIPO . |
| WO 95/01394 | 1/1995 | WIPO . |

*Primary Examiner*—Kriellion Sanders
*Attorney, Agent, or Firm*—Griffin & Szipl, P.C.

[57] ABSTRACT

The invention relates to a fusible stabiliser combination for thermoplastic polymers with the features of the main claim. The invention also relates to a process for the preparation of said combination, and thermoplastic polymers produced by the use thereof.

9 Claims, 4 Drawing Sheets

FUSIBLE STABILIZER COMBINATION

The invention relates to a fusible stabilizer combination for thermoplastic polymers having the characteristics of the main claim.

A halogen-containing thermoplastic resin, such as, for example, polyvinyl chloride (PVC) changes into a polyene structure when a melt-forming process is carried out, whereby hydrochloric acid is eliminated and the polymer is colored. It is conventional to work in metal carboxylates as stabilizers into the resin, in order to improve the thermostability of the polymers. Because, however, an incorporation of the stabilizers alone can lead to so-called metal burning during longer melt-forming processes, which imparts a blackening to the polymer, it is a general practice to incorporate a co-stabilizer.

Because basic lead salts, as well as other heavy-metal-containing stabilizers, are characterized as toxic, it has been attempted to discover stabilizer alternatives. A number of combinations of inorganic and organic compounds are known to be stabilizers for polymers.

Hydrotalcites are proposed as stabilizers in DE 30 19 632 and EP 189 899. These compounds are superior to mixtures of Ca/Zn-metal carboxylate with respect to heat stability and transparency.

Stabilizers produced by use of hydrotalcites cannot be produced according to a melt or fusion process because their content of inorganic and nonfusible components exceeds 50–60%. For this reason, nontoxic stabilizer combinations in the form of tablets, flakes, or melt granules, particularly those for stabilizing PVC films, cable insulations, or wire coatings, do not presently exist.

Most mixtures of Ca/Zn metal carboxylates, in combination with co-stabilizers and lubricants, can be produced in a variety of forms for delivery including powders, pastes, granulates, flakes, or tablets. The powder form has proven to be less advantageous because stabilizer combinations in this delivery form, at best, present electrostatic charge problems and lead to de-homogenization because the differing pouring weights of the components' can lead to sedimentations. While the paste form is free of dust, it demands special dosaging techniques. In addition, pastes can also de-homogenize. Granulates are also dust-free but are, however, disadvantageous in that, for particular applications, such as, for example, in thin films, cable, or wire coatings, particularly insolation, problems result due to the agglomerates left by processing.

DE 13 00 105 describes the production of metal soaps by a process in which, at a temperature of from 120–140° C., the corresponding carboxylic acids are made in a melt with metal oxides, metal hydroxides and acids volatile in metal soaps. One must distinguish between metal soaps that have a sharp melting point (Type I), such as lead, cadmium, zinc, and magnesium stearate, which produce a thin, flowing melt at these temperatures, and those which do not melt above 140° C. or revert to a plastic state, such as double basic lead, calcium, barium, and aluminum stearates (Type II). In the disclosed process, metal soaps of Type II are produced in a melt of metal soaps of Type I or in an excess of carboxylic acid from the corresponding metal oxides, hydroxides, and acids that are volatile in metal soaps. The carboxylic acid excess subsequently converts to a metal soap Type I by means of reaction with a corresponding metal oxide, hydroxide, and acid volatile in metal soaps. The relative quantities amount to 10–40 wt % of Type I metal soap and 60–70% Type II metal soap. Metal soaps which are produced by the process described in DE 13 00 105 have no components which melt above 200° C. or do not melt, and are inferior to the stabilizer combinations of the present invention in stability.

In addition, DE 17 94 429 describes a process for producing dust-free stabilizer-lubricant combinations for halogen-containing polymers, based on metal soaps and lead compounds that are characterized as repro-toxic.

DE 43 05 944 describes basic calcium-zinc-mixed soaps that are dissolved or suspended in a lubricant. Basic metal soaps claimed in DE 43 05 944 possess little stability. In order to achieve higher stability, a variety of co-stabilizers, such as, for example, ALCAMIZER 1, a hydrotalcite produced by the Kyowa Company, are added. It is disadvantageous, however, that DE 43 05 944 does not succeed in producing a usable and dust-free stabilizer combination. It is also disadvantageous that such systems are not suited to all lubricants. Specifically, ester waxes treated in the reaction conditions of DE 43 05 944 (about 100° C. and higher, along with the addition of strong bases) in the presence of small quantities of water lead to partial saponification of the ester wax along with a change in their rheological properties.

It is an objective of the present invention to provide a fusible stabilizer combination, which is suitable as a stabilizer combination for halogen-containing polymers or resin (1), particularly for softening polymers or resins, without the above-mentioned disadvantages of the known stabilizer combinations, and which is classified as nontoxic.

The object is achieved according to the present invention by production of a fusible stabilizer combination obtainable by means of the following process steps:

1. Melting of at least one metal carboxylate (2) of a metal selected from the group consisting of magnesium, zinc, or a mixture thereof, and a higher carboxylic acid, which can be unsaturated, whereby the metal carboxylate (2) is produced, or produced in situ by heating and stirring the corresponding carboxylic acid above its melting point and that of the metal carboxylate formed, subsequent addition of the metal compound, in an amount at most stoichiometric to the amount of carboxylic acid, wherein the metal compound is selected from the group consisting of metal oxide, metal hydroxide, metal carbonate, and/or basic metal carbonate, and wherein at least one metal carboxylate (2) is produced in situ;

2. Optional addition of at least one further metal carboxylate (2) from a metal selected from the group consisting of lithium, sodium, potassium, magnesium, calcium, barium, aluminum, titanium, zirconium, iron, zinc, tin, or a mixture of the above, and from a carboxylic acid that can also be unsaturated, whereby the metal carboxylate (2) is added or produced in situ by heating with stirring the corresponding carboxylic acid above its melting point and that of the metal carboxylate to be produced and subsequent addition of a metal compound in an amount at most stoichiometric to the amount of carboxylic acid added, the metal compound being selected from the group consisting of metal oxide, metal hydroxide, metal carbonate, and/or basic metal carbonate;

3. Addition of at least one antioxidation substance (3) with stirring of the melt;

4. Addition of at least one further metal compound (4) selected from the group consisting of metal hydroxides, metal oxides, basic metal salts, synthetic and/or natural minerals such as hydrotalcite, hydrocalumite, garnets, katoite, hydrogrossulates or ettringits, of the general formula $MeO_a(OH)_b A_c * x\ H_2O$, wherein Me is an up to quadra-valent cation selected from the group consisting of Li, Na, K, Mg, Ca, Zr, Sn, Si, Ti, Al, Fe, as well as Zn, or a mixture thereof, wherein Ti, Sn and/or Zr, in this mixture, may have alkyl substituents with 1–12 C-atoms; A represents an anion, selected from the group consisting of sulfate, sulfite, sulfide, thiosulfate, peroxide, peroxosulfate, hydrogen phosphate, hydrogen phosphite, carbonate, halogenide, nitrate, nitrite, hydrogen sulfate, hydrogen carbonate, hydrogen sulfite, hydrogen sulfide, dihydrogen phosphate, dihydrogen phosphite, monocarboxylic acids such as acetate and benzoate, amide, azide, hydroxide, hydroxyl amide, hydrazide, acetyl acetonate, phenolate, pseudohalogenides, halogenites, halogenates, perhalogenates, $I_3^-$, permanganate, dianions of dicarboxylic acids such as phthalate, oxalate, maleate, and fumarate, bisphenolate, phosphate, pyrophosphate, phosphite, pyrophosphite, trianions of tricarboxylic acid such as citrate, trisphenolate, and/or mixtures thereof;

a+b does not equal 0;

c is selected so that an electro-neutral molecule is formed; and

5. Forming and cooling the melt.

A fusible stabilizer combination according to the present invention reliably prevents the blackening of the polymer formed due to so-called metal burn during melt-forming processes. According to the present invention, the stabilizer combination is produced in a melt process and then apportioned in the form of platelets, wafers, flakes, tablets, little rods, or granules. By means of the production of the stabilizer combination according to the present invention in the above-named forms, it is possible to optimally dosage in a dust-free manner the addition of the stabilizer combination to the halogen-containing thermoplastic polymers. The stabilizer combination according to the present invention is homogeneous. It is also advantageous that the stabilizer combinations according to the present invention are significantly less sensitive with respect to moisture in the air, oxygen in the air, carbon dioxide, and similar environmental influences, in comparison with granulates or powder mixtures not according to the present invention. This is particularly advantageous during longer storage.

An additional advantage lies in the better dispersibility, wherein fewer clumps result in the processed product. Separation, such as is possible in powder mixtures due to the varying densities of the individual components, is ruled out in the stabilizer combinations according to the present invention.

The stabilizer combination according to the present invention is produced by a method in which at least one metal carboxylate is produced in situ from a corresponding carboxylic acid melt and an at most stoichiometric quantity of metal oxide, hydroxide, carbonate, and/or basic metal carbonate, wherein the metal carboxylate is held in the melt. The further fusible or softenable components are then added with stirring to this melt at these temperatures, and, subsequently, all non-fusible components are added.

All metal carboxylates are preferably produced intermediately, wherein the corresponding carboxylic acids are heated to the melting point of the desired metal carboxylate and, at this temperature, the corresponding metal oxide, metal hydroxide, metal carbonate and/or basic metal carbonate are added with stirring. By consecutive addition of carboxylic acids and/or metal components, mixtures of various metal carboxylates can also be produced. Further metal carboxylates, not produced in situ, can also be added to the melt.

During the production of the stabilizer combinations according to the present invention in the melt process, cations and anions are found in equilibrium after the addition of the reaction components. In this manner, the stabilizer combinations according to the present invention no longer correspond to a powder mixture containing the metal hydroxides, metal oxides, basic metal salts, synthetic and/or natural minerals (4) such as hydrotalcites, garnets, katoites, hydrogrossulates, ettringits, etc., metal carboxylates (2), antioxidants and/or metal salts (3) thereof, and the combinations are possibly only producible according to the methods described herein. It is also advantageous that a reduction of viscosity of the melt can be achieved through appropriate coupling agents.

It is an advantage of the melt process that, by means of the exothermic neutralization reaction of the added metal salt (basic metal salts, basic metal carbonates, metal carbonate, metal oxide and/or metal hydroxide) with the carboxylic acid, a portion of the necessary melting heat is produced and inconvenient precipitation, filtration, drying and/or grinding processes are avoided. It is an additional advantage that lubricants and other processing aids can be added, by appropriate selection, without problems.

It has been surprisingly found that halogen-containing thermoplastic resins and parts made thereof containing the stabilizer combinations according to the present invention have at least equally good properties compared with halogen-containing thermoplastic resins and parts made thereof which contain stabilizer combinations not according to the present invention, or those based on toxic lead compounds.

The carboxylic acids used in the stabilizer combinations according to the present invention preferably comprise carboxylic acids selected from the group consisting of saturated and unsaturated carboxylic acids of 8 to 60, more preferably 12 to 40 carbon atoms, particularly stearic, palmitic, myristic, lauric, oil acid, oleic acid or ricinolic acid and/or mixtures thereof.

Cations in the metal carboxylates (2) which are added to the stabilizer combination of the present invention as metal compounds are preferably selected from the group consisting of lithium, sodium, potassium, magnesium, calcium, barium, aluminum, titanium, zirconium, iron, zinc, and tin, either alone, or mixtures thereof. Particularly preferable is the use of zinc oxide, zinc hydroxide, zinc carbonate, basic zinc carbonate, magnesium oxide, magnesium hydroxide, magnesium carbonate, and/or basic magnesium carbonate or mixtures thereof. Zinc salts are particularly effective for the dyeing process. It is therefore preferable to use at least one zinc salt and/or magnesium salt of a higher carboxylic acid. Even though the above-named metal carboxylates can be used individually, an even greater stabilization effect can be achieved by the use of two or more of the same in combination.

The cations of the added metal salts (4) are preferably selected from the group consisting of Li, Na, K, Mg, Ca, Zr, Sn, Si, Ti, Al, Fe, as well as Zn or mixtures thereof, wherein Ti, Sn, and/or Zr can, in this mixture, also carry 1 to 2 alkyl substituents with 1 to 12 C-atoms.

The anions of the added metal salts (4) are preferably selected from the group consisting of, in the case of basic salts, sulfate, sulfite, sulfide, thiosulfate, peroxide, peroxosulfate, hydrogen phosphate, hydrogen phosphite, carbonate, halogenide, nitrate, nitrite, hydrogen sulfate, hydrogen carbonate, hydrogen sulfite, hydrogen sulfide, dihydrogen phosphate, dihydrogen phosphite, monocarboxylic acid anions such as acetate and benzoate, amide, azide, hydroxide, hydroxyl amide, hydrazide, acetyl acetonate, phenolate, pseudohalogenide, halogenite, halogenate, perhalogenate, $I_3^-$, permanganate, dianions of dicarboxylic acids such as phthalate, oxalate, maleate and fumurate, bisphenolate, phosphate, pyrophosphate, phosphite, pyrophosphite, trianions of tricarboxylic acids such as citrate, trisphenolate, among others, and/or mixtures thereof. Among anions of the added metal salts, hydroxide, carbonate, phosphite and/or maleate are particularly preferred.

The antioxidants of the stabilization combinations according to the present invention are preferably alkylphenol, hydroxyphenyl propionate, hydroxybenzyl compounds, alkylidene bisphenols, thiobisphenols and/or aminophenols, as well as salts or mixtures thereof. Examples of the above antioxidants which do not form salts are thioethers, sterically hindered amines and/or phosphonites. Particularly preferred are, for example, 2,6-di-tert.-butyl-4-methyl-phenol, 2,6-di-benzyl-4-methyl-phenol, stearyl-3-(3'-5'-di-tert.-butyl-4'-hydroxy-phenyl)propionate, 4,4'-thiobis-(3-methyl-6-tert.-butyl-phenol), 4-nonylphenol, 2,2'-methylenebis(4-methyl-6-tert.-butylphenol), 2,5-di-tert.-butylhydrochinone, 4,4',4"-(1-methyl-1-propanyl-3-ylidene)tris[2-(1,1-dimethylethyl)-5-methyl-phenol, neutral or basic salts thereof of lithium, magnesium, calcium, zinc and/or aluminum, as well as mixtures of the above antioxidants and/or their salts.

Examples of the above antioxidants which do not form salts are thioethers, such as dilaurylthiodipropionate and/or distearylthiodipropionate, sterically hindered amines and/or phosphonites.

While according to the present invention melts of (2), (3) and (4) produce stabilizer combinations for (1) with high stability, good starting color and good colorfastness, additional distinct improvements of the stabilizing properties can be achieved if one or more known co-stabilizers for halogen-containing polymers are additionally added. A distinct improvement in the starting color can be achieved by at least one substance (5) as a co-stabilizer, selected from the group consisting of 1,3-diketo compounds, polyols, zeolites, amino acid derivatives, organic esters of phosphorous acid. In addition, the addition of at least one substance (6), selected from the group consisting of epoxy compounds, can lead to a distinct improvement in color processing. The addition of at least one substance (5) plus at least one substance (6) is very advantageous.

The addition of at least one co-stabilizer (5) and one co-stabilizer (6) to the stabilizer mixture according to the present invention is particularly preferred. The group of co-stabilizers (5) is more specifically stated as follows.

Preferred are those selected from the group of 1,3-diketo compounds, dibenzoyl methane, stearoylbenzoyl methane, palmitoylbenzoyl methane, myristoylbenzoyl methane, lauroylbenzoyl methane, benzoyl acetone, acetyl acetone, tribenzoyl methane, diacetylaceto benzene, p-methoxystearoyl acetophenone, acetocetic acid ester and acetyl acetone, as well as their metal salts, particularly those of lithium, sodium, potassium, calcium, magnesium, zinc, tin, titanium, aluminum and/or iron.

The group of polyols includes, preferably, trismethylol propane, di-(trismethylol propane), erythritol, pentaerythritol, dipentaerythritol, sorbitol, mannitol, etc.

Of the group of zeolites used as co-stabilizer (5) for the stabilizer combination according to the present invention, preferred zeolites are A3-, A4-, A5-zeolites, zeolites of mordenite, erionite, faujasite X- or Y-type and/or ZSM-5 zeolites and/or mixtures thereof. Preferred exchangeable cations therein are protons, ammonium, lithium, sodium, potassium, magnesium, calcium, zinc, and/or tin cations.

Preferred of the group of amino acids, or their derivates, are glycine, alanine, lysine, tryptophan, acetylmethionine, pyrrolidone carboxylic acids, α-aminocrotonic acid, α-aminoacrylic acid, α-aminoadipidinic acid, among others, as well as their esters. The alcohol component of these esters comprises, preferably, among others, single alcohols, such as methyl alcohol, ethyl alcohol, propyl alcohol, isopropyl alcohol, butyl alcohol, α-ethyl hexanol, octyl alcohol, iso-octylalcohol, lauryl alcohol, stearyl alcohol, among others, and/or polyols, such as ethylene glycol, propylene glycol, 1,3-butanediol, 1,4-butanediol, glycerol, diglycerol, trismethylolpropane, pentaerythritol, dipentaerythritol, erythritol, sorbitol, mannitol, among others.

Particularly preferred among esters of the phosphorous acids are, among others, triaryl phosphite, such as triphenyl phosphite, tris(p-nonylphenyl)phosphite and the like; alkylaryl phosphites, such as monoalkyldiphenyl phosphite, for example, diphenylisooctyl phosphite, diphenylisodecyl phosphite and the like, dialkylmonophenyl phosphite, such as phenyldiisooctyl phosphite, phenyldiisodecyl phosphite and the like; and/or trialkyl phosphites, such as triisooctyl phosphite, tristearyl phosphite and the like.

Additionally preferred epoxy compounds used as co-stabilizer (6) comprise the group including various animal or plant oils such as epoxy soy oil, epoxy rape oil, and the like, epoxidated carboxylic acid esters such as epoxidated epoxymethyloleate, epoxybutyloleate, and the like, epoxidated alicyclic compounds, glycidyl ethers such as bisphenol-A-diglycidyl ether, bisphenol-F-diglycidyl ether and the like; glycidyl esters, such as glycidyl acrylate, glycidyl methacrylate, polymers and copolymers thereof; and/or epoxidated polymers, such as epoxidated polybutadienes, epoxidated ABS and the like. Stable additives (7) known in the art can be advantageously added to the thermoplastic resins (1) stabilized by the stabilizer combinations according to the present invention, such as softeners, fillers, lubricants, dyes, pigments, antistatic substances, surface-active agents, foaming agents, impact toughness modifiers, and/or UV stabilizers. These additives (7) can be added to the melt of carboxylic acid and metal salt, and worked in, without leading to separation or other problems with the stabilizer combination according to the present invention. It is particularly useful to add a softener. Therefore, for example, phthalic acid esters, aliphatic dibasic esters, trimellithic acids, phosphates, carboxylic acid esters, epoxy softeners, polyester softeners, chlorinated paraffin and/or similar softeners can be added to the halogen-containing thermoplastic resin in appropriate relative amounts.

Forming processes in which thermoplastic resin compositions stabilized by the stabilizer combinations according to the present invention include calendering, extrusion, injection molding, blow molding and other methods known to one skilled in the art. Polymers which contain stabilizer combinations according to the present invention are outstandingly used in the above processes.

Examples of applicable, halogen-containing thermoplastic resin (1), to which the stabilizer combination according to the present invention can be added, include PVC, polyvinylidene chloride, chlorinated or chlorosulfonated polyethylene, chlorinated polypropylene, or ethylene/vinylacetate copolymers. Particularly advantageous are resins of the PVC type, that is, vinyl chloride homopolymers and copolymers of vinyl chloride with other monomers.

The composition according to the present invention exhibits a plate-out phenomenon during calendering and allows extrusion for long periods of operation. Furthermore, the resulting products are free of discoloration.

The present invention is therefore a remarkable new contribution to the progress of the state of the art, particularly in the processing of thermoplastic resins of PVC, polyvinylidene chloride, chlorinated polyethylene, chlorosulfonated polyethylene, chlorinated polypropylene and/or ethylene/vinyl acetate copolymers, as well as other halogen-containing thermoplastic resins.

The above invention will be more particularly described as follows.

The formulations for halogen-containing thermoplastic resins in which the components of the stabilizer combination according to the present invention can be used are as follows:

The components for production of the fusible stabilizer combination according to the present invention are presented in Table 1 in the order of their addition. For this manufacture, stearic acid was heated to 130–170° C. with stirring and the indicated amount of magnesium oxide (MgO) was added. As soon as a clear solution was obtained, the indicated amount of zinc oxide (ZnO) was added next. After a clear solution was obtained, the low melting components were added first and thereafter the high or nonmelting components were added. After two hours of waiting time at 120–170° C., the cloudy melt was poured onto a sheet and tablets were formed.

TABLE 1

Components for the production of the fusible stabilizer combination according to the present invention

| Example --> | 1A | 1B | 1C | 1D | 1E | 1F | 1G |
|---|---|---|---|---|---|---|---|
| Raw Material (in g) | | | | | | | |
| stearic acid | — | 108.08 | 103.16 | 98.72 | 98.72 | 108.08 | — |
| oil acid | 112.68 | — | — | — | — | — | 92.30 |
| MgO | 6.28 | 5.96 | 5.68 | 5.44 | 5.44 | 6.00 | 3.48 |
| ZnO | 4.00 | 3.80 | 3.68 | 3.48 | 3.48 | 3.80 | 6.68 |
| paraffin wax[a)] | — | 18.12 | 16.36 | 14.80 | 14.80 | 18.08 | — |
| DLTDP[b)] | 25.00 | 23.80 | 22.72 | 21.72 | 21.72 | 23.80 | 25.00 |
| antioxidant | 25.00 | 23.80 | 22.72 | 21.72 | 21.72 | 23.80 | 25.00 |
| DBM[d)] | — | — | 18.20 | — | 17.40 | — | — |
| StBM[e)] | — | — | — | 17.40 | — | — | — |
| alcamizer 1[f)] | 210.00 | — | — | — | — | — | 150.00 |
| alcamizer 4[f)] | — | 200.00 | 190.92 | 200.00 | 200.00 | 142.88 | — |
| 4A zeolite | — | — | — | — | — | 57.16 | 60.00 |

[a)]Drip point 55–77° C.,
[b)]Dilaurylthiodipropionate,
[c)]Stearyl-3-(3'-5'-di-tert.-butyl-4'-hydroxyphenyl)propionate,
[d)]Dibenzoylmethane,
[e)]Stearoylbenzoylmethane,
[f)]Kyowa metalcarboxylate (2): 20 to 70 wt. %; preferably 30 to 60 wt. %;

antioxidants (3): 1 to 20 wt. %; preferably 5 to 15 wt. %;

metal compounds (4): 30 to 70 wt. %; preferably 35 to 60 wt. %;

co-stabilizer (5): 0 to 20 wt. %; preferably 2 to 15 wt. %;

co-stabilizer (6): 0 to 20 wt. %; preferably 2 to 15 wt. %; up to 100 wt. %.

The dispensing of the stabilizer combination according to the present invention to thermoplastic resin (1) is from 0.8 to 20 phr (per hundred resin—parts by weight to 100 parts by weight resin), preferably 1.5 to 15 phr, particularly 2 to 8 phr.

The desired stabilization properties can hardly be achieved if the component carboxylic acid, metal salt and antioxidant are missing or if the proportional amount of these components with respect to the polymer departs from the above ranges.

The invention is more particularly pointed out by means of the following examples, without being limited thereto.

EXAMPLE 1

Production of the fusible stabilizer combination according to the present invention.

EXAMPLE 2

Production of fusible stabilizer combinations according to the present invention Components for the production of fusible stabilizer combinations (2H) according to the present invention and stabilizer combinations not according to the present invention (IIa=fusion experiment; IIb=powder mixture) are given in Table 2 in the order of their addition. It is clearly seen from Table 2 that the stabilizer combination 2H according to the present invention can be made when the metal stearate is made in situ. If one uses the metal stearate as a starting material (Experiment IIa) and not with in situ production, the stabilizer combination of the present invention cannot be made.

TABLE 2

Comparison of the production of the stabilizer combination according to the present invention with examples not according to the present invention.

| Compound --> | 2H[a)] | IIa[b)] | Ib[c)] |
|---|---|---|---|
| Raw Material (in g) | | | |
| magnesium stearate[d)] | — | 60.61 | 60.61 |
| zinc stearate[e)] | — | 60.61 | 60.61 |
| stearic acid | 112.64 | — | — |

TABLE 2-continued

Comparison of the production of the stabilizer combination according to the present invention with examples not according to the present invention.

| Compound --> | 2H[a] | IIa[b] | Ib[c] |
|---|---|---|---|
| MgO | 2.56 | — | — |
| ZnO | 8.08 | — | — |
| paraffin wax | 24.24 | 24.24 | 24.24 |
| DLTDP[g] | 24.24 | 24.24 | 24.24 |
| antioxidants | 24.24 | 24.24 | 24.24 |
| ALCAMIZER[i] 4 | 206.08 | 206.08 | 206.08 |
| fusible? | yes | no | — |
| fusion range[k] | 73–88° C. | — | 40–45° C. |
|  |  |  | 50–70° C. |
|  |  |  | 90–155° C. |
| nonmelting residue? | yes |  | yes |
| melt range . . . | 47° C. |  | 45° C. |
|  | 80° C. |  | 54° C. |
|  |  |  | 90° C. |
|  |  |  | 123° C |
| IR/cm-1[m] | 3500s | 3500s |  |
|  | 2900s | 2900s |  |
|  | 2700s | 2700s |  |
|  | 1800s | — |  |
|  | 1600s | 1600w |  |
|  | 1500w | 1500s |  |
|  | 1300s | 1300s |  |
|  | 1200s | — |  |
|  | 750s | 750s |  |
|  | 650s | 650s |  |
|  | 550s | 550s |  |

Figure 1:
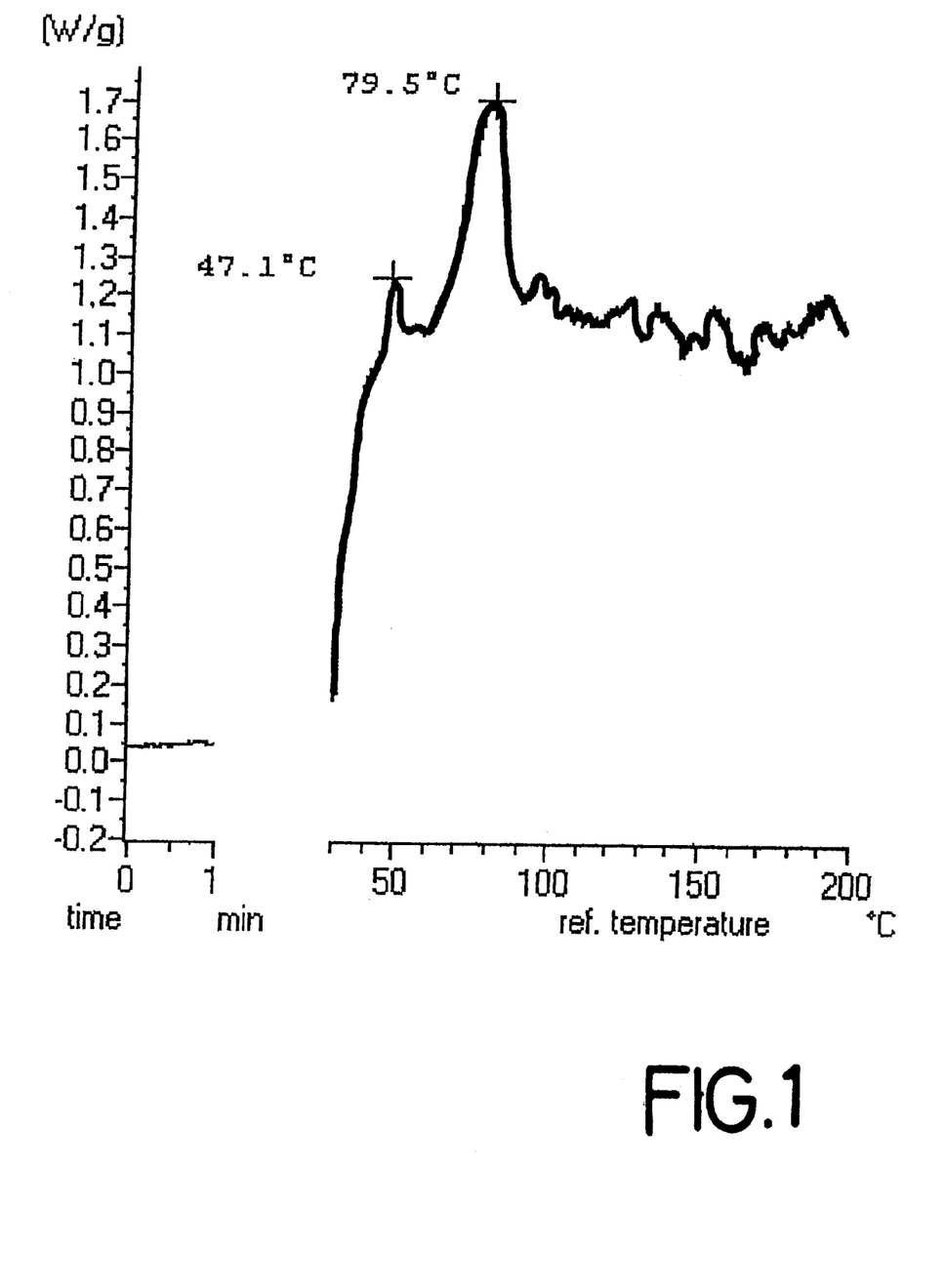
FIG. 1 shows a differential thermoanalysis (DSC, differential scanning calorimetry) of the stabilizer combination 2H according to the present invention.
Figure 2:
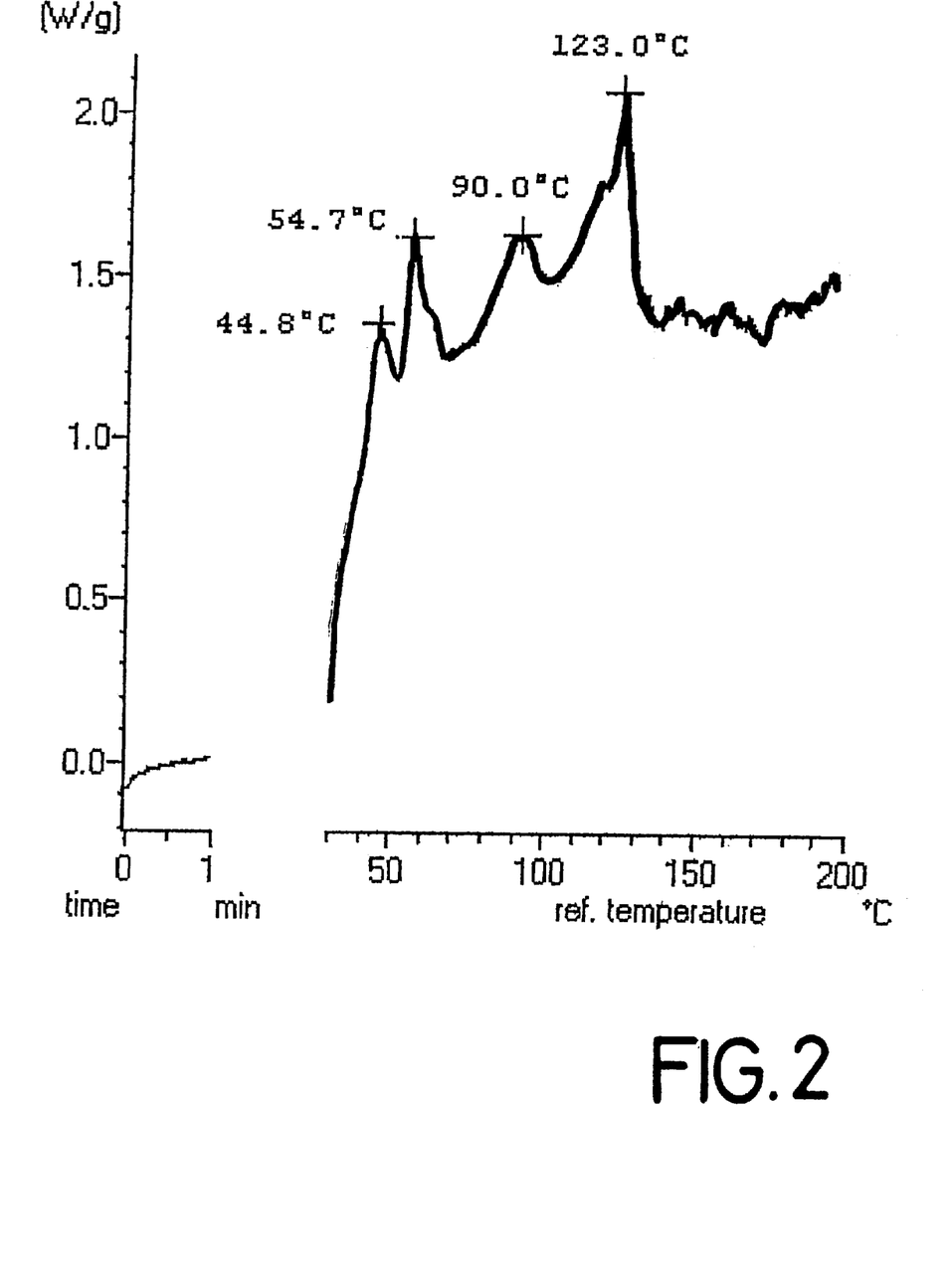
FIG. 2 shows a differential thermoanalysis of the stabilizer combination IIb not according to the present invention.
Figure 3:
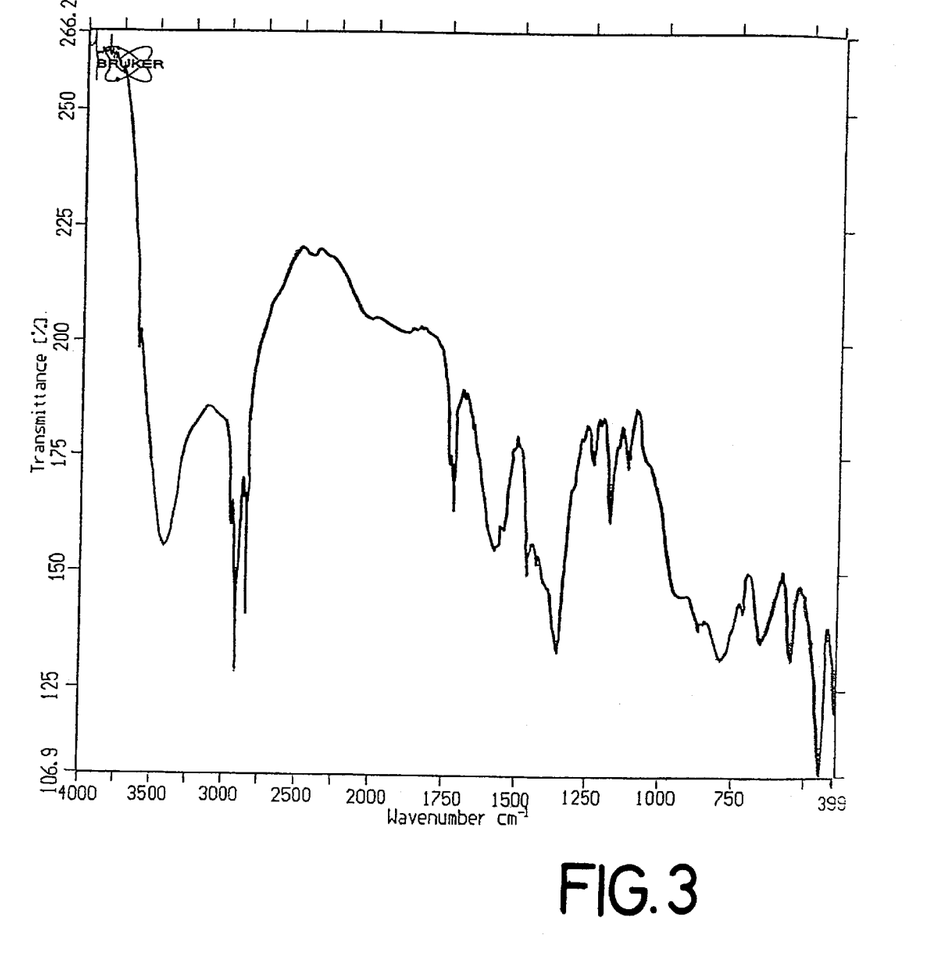
FIG. 3 shows an infrared spectrum of the stabilizer combination 2H according to the present invention. FTIR spectrum, recorded with a Bruker IFS 66
Figure 4:
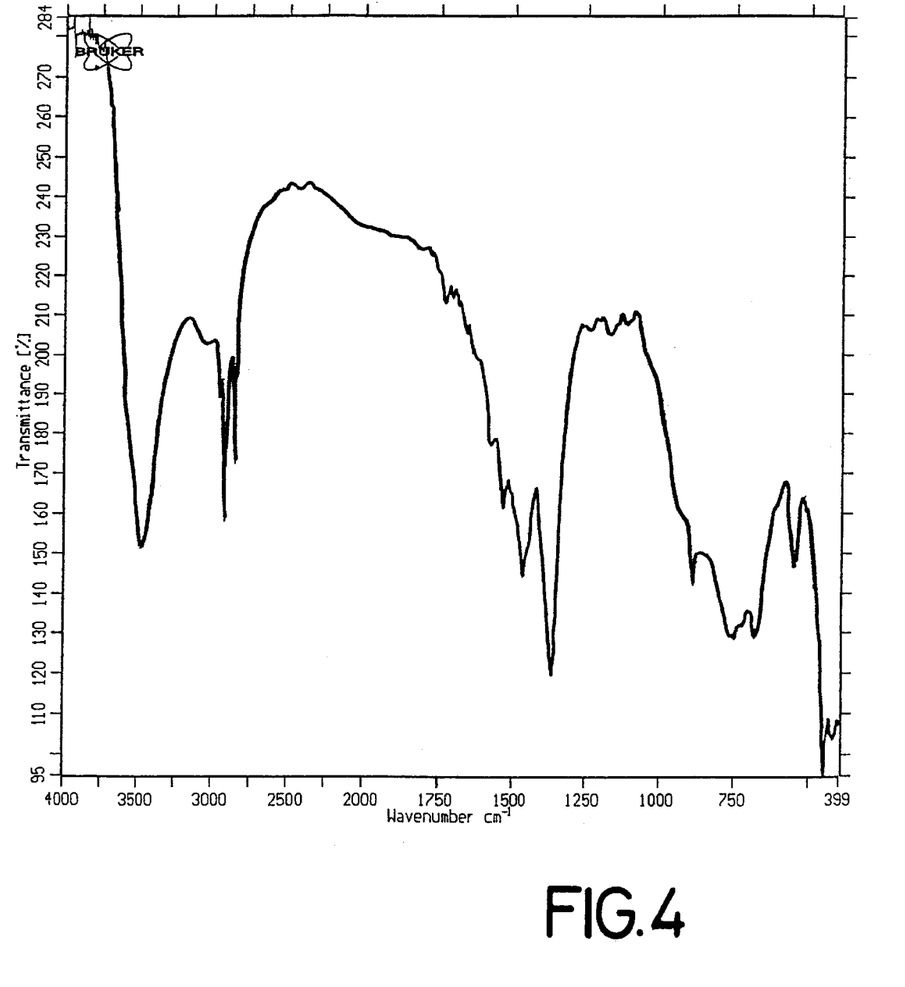
FIG. 4 shows an infrared spectrum of a stabilizer combination IIb not according to the present invention. FTIR spectrum, recorded with a Bruker IFS 66

[a] Fusion experiment according to Example 1, stabilizer according to the present invention,
[b] Fusion experiment, stabilizer not according to the present invention,
[c] Powder mixture analogous to Example 3 in its production, stabilizer not according to the present invention,
[d] Greven Co., Fp ≈ 140° C.,
[e] Greven Co., Fp = 118–120° C.,
[f] Drip point 55–75° C.,
[g] Dilaurylthiodipropionate,
[h] Stearyl-3-(3'-5'-di-tert.-butyl-4'-hydroxy-phenyl)propionate,
[i] Kyowa
[k] Reichert melting point microscope, uncorrected,
[l] DSC, compare FIG. 1 and FIG. 2,
[m] Bruker IFS, compare FIG. 3 and FIG. 4.

Observation of the melting properties supports the following statements. It can be seen under the melting point microscope that the stabilizer combination 2H according to the present invention melts relatively homogeneously (FIG. 1) and a nonmeltable residue remains until 300° C. It is furthermore clear that the powder mixture IIb not according to the present invention melts more or less in its individual components (FIG. 2) and that a nonmeltable residue remains up to 300° C.

A comparison of the infrared spectra of the stabilizer combination 2H according to the present invention (FIG. 3) with the stabilizer combination IIb not according to the present invention (FIG. 4), clearly shows differences in absorption.

The melting points which were observed under the microscope and with DSC measurements, as well as the IR spectra (FIG. 3 and FIG. 4) prove that the compound 2H according to the present invention relates to different substances that can only be obtained by the process according to the present invention, when compared to the powder mixture IIb.

EXAMPLE 3

Production of stabilizer combinations not according to the present invention

Table 3 shows the components for production of stabilizer combinations not according to the present invention in the order of their addition. For the production, these components were homogenized in a household mixture at low revolutions for 5 min.

TABLE 3 stabilizer combination not according to the present invention/Chemson Ges.m.b.H.

| Compound --> | IIIc | IIId |
|---|---|---|
| Raw Material (in g) |  |  |
| calcium hydrate | 82.50 | — |
| zinc stearate | 15.00 | — |
| bisphenol A | 2.50 | — |
| PKX 6000[a] | — | 100 |

[a] (typical, commercial, powdered, lead-based stabilizer compound)

EXAMPLE 4

Examination of fusible stabilizer combinations according to the present invention in PVC In the following examples, the heat stability and starting color of formed objects of PVC containing the stabilizers according to the present invention, are compared with formed objects in which, for purposes of comparison, a stabilizer not according to the present invention was added.

PVC resin masses (100 parts PVC with a K-value of 71, 50 parts di-i-nonylphthalate (not stabilised) and 50 parts chalk along with an amount of stabilizer combination according to Table 4) were homogenized and plastified in a laboratory rolling mill for 5 min. at 180° C. A test strip of 10 mm width was cut out of the resulting 1 mm thick rolled skin and tempered at 180° C. in a MATHIS thermo oven. After 30 min., the test strip was taken 23 mm out of the oven until a black discoloration was visible (Table 4).

TABLE 4

Results of the study of the fusible stabilizer combination according to the present invention in PVC

| Compound --> | 1A | 1B | 1C | 1D | 1E | 1F | 1G | 2H | IIIc | IIId |
|---|---|---|---|---|---|---|---|---|---|---|
|  | <------------according to the present invention------------> |
| Added amount/parts | 4.0 | 4.0 | 4.0 | 4.0 | 4.0 | 4.0 | 4.0 | 4.0 | 4.0 | 4.0 |
| MTT/min.[a] | 270 | 280 | 240 | 290 | 290 | 300 | 310 | 210 | 210 | 250 |
| YI[b] after 0 min. | 44 | 42 | 45 | 43 | 42 | 43 | 42 | 43 | 44 | 40 |

[a] MATHIS-Thermo-Test,
[b] Yellowness Index according to the standard proposal DIN 6167

The comparison between the compounds 1A to 2H according to the present invention and the comparative examples not according to the present invention show that the compounds according to the present invention have equal and in part better stability than the comparative examples which contain powdered, dusty stabilizer mixtures. The starting color (YI after 0 min.) of the compounds according to the present invention is comparable to that of the comparative examples. It must be taken into consideration that in Comparative Example IIId that compounds are contained which result in a white pigment effect at the dosages used so that they lower the YI value.

DESCRIPTION OF THE FIGURES

Measurement Conditions

Measurement device: METTLER TOLEDO

| Sample: | Mass: |
|---|---|
| 2H | (04.10 2.245 mg |
| DSC12E | 16-02-96 |

Measurement Conditions

Measurement Device: METTLER TOLEDO

| Sample: | Mass: |
|---|---|
| IIb | (Powder 2.58 mg |
| DSC12E | 16-02-96 |

Sample name: 2H (04.10.95)

Method: STRANS

Mode: solid

Date: 16/02/96 Time: 9:02

Sample name: IIb (powder)

Method: STRANS

Mode: solid

Date: 16/02/96 Time: 8:47

What is claimed is:

1. A fusible stabilizer combination for thermoplastic polymers, obtainable by means of the following process steps:
    1. Melting of at least one metal carboxylate (2) of a metal selected from the group consisting of magnesium, zinc, or a mixture thereof, and a higher carboxylic acid, which can be unsaturated,
    whereby the metal carboxylate (2) is produced, or produced in situ by heating and stirring the corresponding carboxylic acid above its melting point and that of the metal carboxylate formed, subsequent addition of the metal compound, in an amount at most stoichiometric to the amount of carboxylic acid, wherein the metal compound is selected from the group consisting of metal oxide, metal hydroxide, metal carbonate, and/or basic metal carbonate, and
    wherein at least one metal carboxylate (2) is produced in situ;
    2. optional addition of at least one further metal carboxylate (2) made from a metal selected from the group consisting of lithium, sodium, potassium, magnesium, calcium, barium, aluminum, titanium, zirconium, iron, zinc, tin, or a mixture of the above, and from a carboxylic acid that can also be unsaturated, whereby the metal carboxylate (2) is added or produced in situ by heating with stirring the corresponding carboxylic acid above its melting point and that of the metal carboxylate to be produced and subsequent addition of a metal compound in an amount at most stoichiometric to the amount of carboxylic acid added, the metal compound being selected from the group consisting of metal oxide, metal hydroxide, metal carbonate, and/or basic metal carbonate;
    3. addition of at least one antioxidation substance (3) with stirring of the melt;
    4. addition of at least one further metal compound (4) selected from the group consisting of metal hydroxides, metal oxides, basic metal salts, synthetic and/or natural minerals such as hydrotalcite, hydrocalumite, garnets, katoite, hydrogrossulates or ettringits, of the general formula $MeO_a(OH)_bA_c*x\ H_2O$, wherein
        Me is an up to quadra-valent cation selected from the group consisting of Li, Na, K, Mg, Ca, Zr, Sn, Si, Ti, Al, Fe, as well as Zn, or a mixture thereof, wherein Ti, Sn and/or Zr, in this mixture, may have alkyl substituents with 1–12 C-atoms; A represents an anion, selected from the group consisting of sulfate, sulfite, sulfide, thiosulfate, peroxide, peroxosulfate, hydrogen phosphate, hydrogen phosphite, carbonate, halogenide, nitrate, nitrite, hydrogen sulfate, hydrogen carbonate, hydrogen sulfite, hydrogen sulfide, dihydrogen phosphate, dihydrogen phosphite, monocarboxylic acids such as acetate and benzoate, amide, azide, hydroxide, hydroxyl amide, hydrazide, acetyl acetonate, phenolate, pseudohalogenide, halogenite, halogenate, perhalogenate, $I_3^-$, permanganate, dianions of dicarboxylic acids such as phthalate, oxalate, maleate, and fumarate, bisphenolate, phosphate, pyrophosphate, phosphite, pyrophosphite, trianions of tricarboxylic acid such as citrate, trisphenolate, and/or mixtures thereof;
        a+b does not equal 0;
        c is selected so that an electro-neutral molecule is formed; and
    5. forming and cooling the melt.

2. A fusible stabilizer combination according to claim 1, characterized in that the added higher carboxylic acid is selected from the group consisting of straight chained or branched aliphatic carboxylic acids with 12 to 40 carbon atoms, which can also be unsaturated, and mixtures thereof.

3. Fusible stabilizer combination according to claim 2, characterized in that the added higher carboxylic acid is selected from the group consisting of stearic acid, palmitic acid, myristic acid, lauric acid, oil acid, oleic acid, ricinolic acid, and mixtures thereof.

4. Fusible stabilizer combination according to claim 1, characterized in that the antioxidant (3) is selected from the group consisting of alkyl phenols, hydroxyphenyl propionates, hydroxybenzyl compounds, alkylidene bisphenols, thiobisphenols, dialkylthiodicarboxylates, particularly dialkylthiodipropionates, aminophenols, as well as their salts and mixtures thereof.

5. Fusible stabilizer combination according claim 1, characterized in that, in addition to the antioxidant at least one co-stabilizer is added, selected from the group consisting of 1,3-diketocompounds, polyols, zeolites, amino acids, amino acid derivatives, organic esters of phosphorous acids, epoxy compounds, and mixtures thereof.

6. Fusible stabilizer combination according to claim 1, characterized in that additional compounds (7), selected from the group consisting of fillers, lubricants, colorants, pigments, antistatic agents, surface active agents, foaming agents, toughness modifying agents and/or UV stabilizers are added to the melt.

7. Thermoplastic polymer, characterized in that the polymer contains a fusible stabilizer combination according to claim 1.

8. Thermoplastic polymer according to claim 7, characterized in that the polymer is selected from the group consisting of PVC, polyvinylidene chloride, chlorinated polyethylene, chlorosulfonated polyethylene, chlorinated polypropylene, and/or ethylene/vinyl acetate copolymers.

9. Thermoplastic polymer according to claim 7, characterized in that a further compound (7), is contained, selected from the group consisting of fillers, lubricants, softeners, colorants, pigments, antistatic agents, surface active agents, foaming agents, impact toughness modifiers, UV stabilizers, and mixtures thereof.

\* \* \* \* \*